(12) United States Patent
Shimizu

(10) Patent No.: US 11,346,939 B2
(45) Date of Patent: May 31, 2022

(54) SURROUNDING MONITORING RADAR DEVICE

(71) Applicant: DENSO CORPORATION, Kariya (JP)

(72) Inventor: Naotsugu Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 202 days.

(21) Appl. No.: 16/595,769

(22) Filed: Oct. 8, 2019

(65) Prior Publication Data

US 2020/0057139 A1 Feb. 20, 2020

Related U.S. Application Data

(63) Continuation of application No. PCT/JP2018/014798, filed on Apr. 6, 2018.

(30) Foreign Application Priority Data

Apr. 10, 2017 (JP) .............................. JP2017-077485

(51) Int. Cl.
| | |
|---|---|
| *G01S 13/931* | (2020.01) |
| *G01S 7/36* | (2006.01) |
| *G01S 7/40* | (2006.01) |
| *G01S 13/93* | (2020.01) |
| *G01S 7/02* | (2006.01) |
| *G01S 7/35* | (2006.01) |

(52) U.S. Cl.
CPC ............ *G01S 13/931* (2013.01); *G01S 7/023* (2013.01); *G01S 7/36* (2013.01); *G01S 7/40* (2013.01); *G01S 13/93* (2013.01); *G01S 7/356* (2021.05)

(58) Field of Classification Search
CPC ............... G01S 7/40; G01S 7/36; G01S 13/93
See application file for complete search history.

(56) References Cited

U.S. PATENT DOCUMENTS

| 6,266,004 | B1 * | 7/2001 | Pannert ................. G01S 13/931 342/70 |
| 7,187,321 | B2 * | 3/2007 | Watanabe ............. G01S 13/931 342/173 |
| 2006/0181448 | A1 * | 8/2006 | Natsume ................. G01S 7/023 342/70 |
| 2006/0269017 | A1 * | 11/2006 | Beadle ................. H04B 1/7156 375/343 |
| 2008/0231496 | A1 * | 9/2008 | Sakamoto ............. G01S 13/345 342/59 |

(Continued)

FOREIGN PATENT DOCUMENTS

| JP | 2008-089505 A | 4/2008 |
| JP | 2008-232833 A | 10/2008 |

*Primary Examiner* — Marcus E Windrich
(74) *Attorney, Agent, or Firm* — Maschoff Brennan

(57) ABSTRACT

A surrounding monitoring radar device includes a signal generation unit, a spectrum generation unit, a cycle setting unit, a learning unit, and an update unit. At an update timing, the update unit updates a determination reference to a learned value calculated by the learning unit. the learning unit is configured to: set the learning value to an initial value at a start timing of the learning period; compare the learned value with a value of a noise floor of the generated frequency spectrum during the learning period; and update the learned value to the value of the noise floor upon the value of the noise floor being smaller than the learned value.

5 Claims, 8 Drawing Sheets

(56) References Cited

U.S. PATENT DOCUMENTS

2009/0051581 A1\* 2/2009 Hatono .................. G01S 13/10
 342/33
2016/0245911 A1\* 8/2016 Wang ..................... G01S 7/292

\* cited by examiner

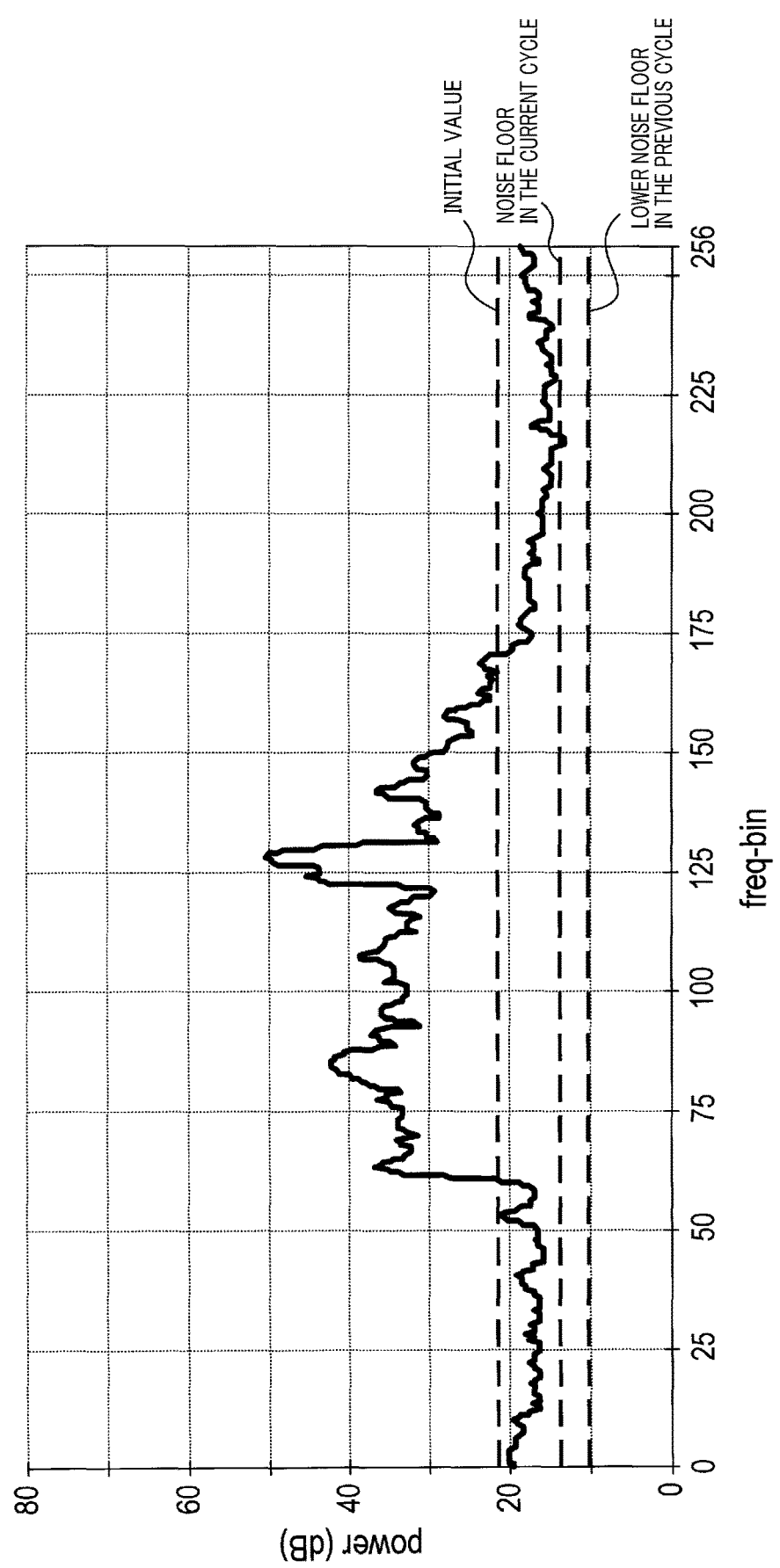

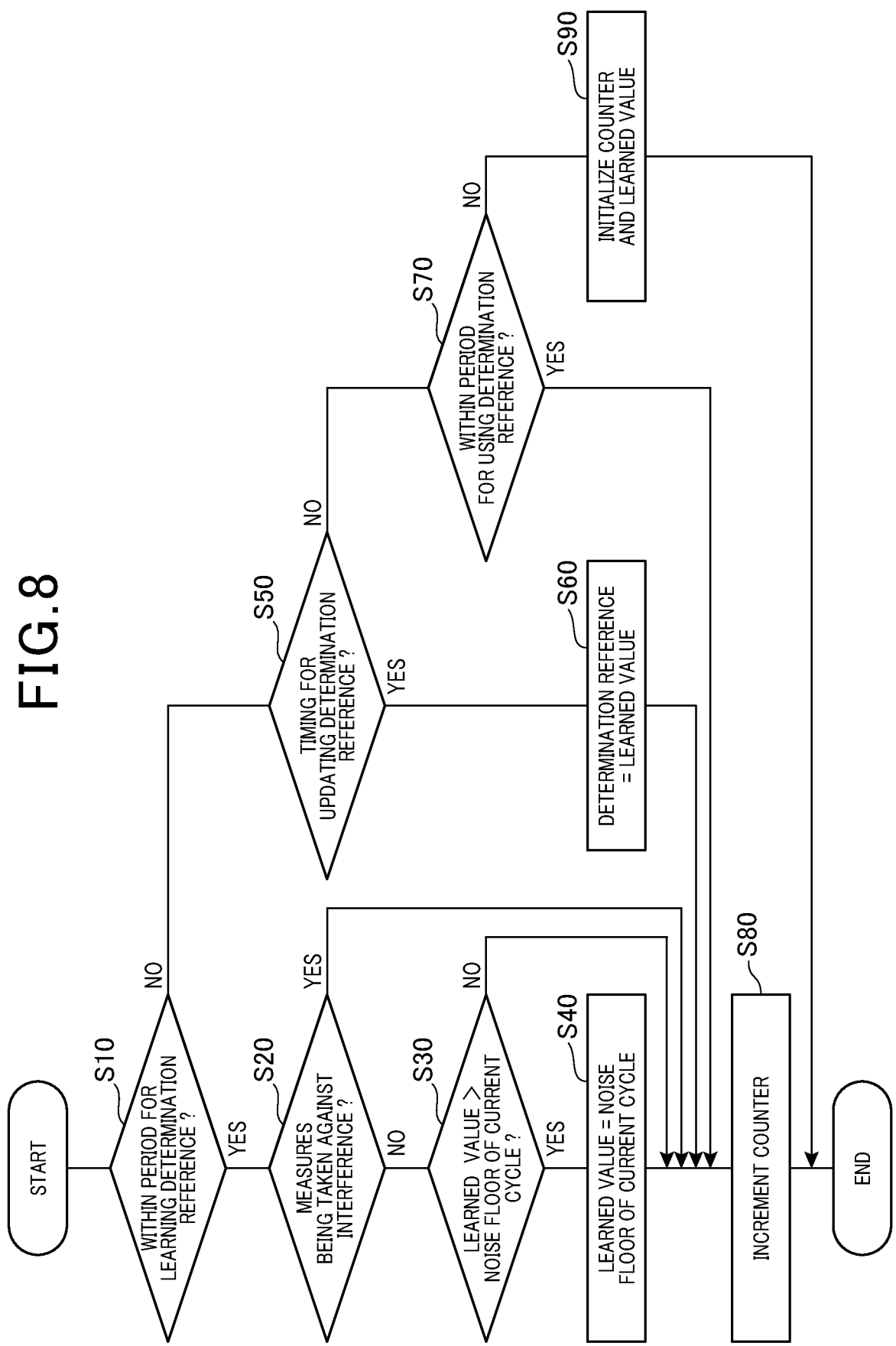

SURROUNDING MONITORING RADAR DEVICE

CROSS-REFERENCE OF RELATED APPLICATIONS

The present application is a continuation application of International Application No. PCT/JP2018/014798, filed on Apr. 6, 2018, which claims priority to Japanese Patent Application No. 2017-077485 filed on Apr. 10, 2017. The contents of these applications are incorporated herein by reference in their entirety.

BACKGROUND

Technical Field

The present disclosure relates to a radar device that monitors the surrounding of a vehicle.

Background Art

A noise level is compared with a threshold, which is a fixed value, and occurrence of radio wave interference is detected if the noise level is equal to or greater than the threshold.

SUMMARY

The present disclosure preferably provides a technique for accurately detecting radio wave interference. The vehicle-onboard surrounding monitoring radar devices includes a signal generation unit, a spectrum generation unit, a cycle setting unit, a learning unit, and an update unit. At an update timing, the update unit updates a determination reference to a learned value calculated by the learning unit. the learning unit is configured to: set the learning value to an initial value at a start timing of the learning period; compare the learned value with a value of a noise floor of the generated frequency spectrum during the learning period; and update the learned value to the value of the noise floor upon the value of the noise floor being smaller than the learned value.

BRIEF DESCRIPTION OF THE DRAWINGS

FIG. 7 is a graph showing an initial value of a reference value, noise floors of the current processing cycle, and the lowest noise floor of the previous processing cycle.

FIG. 8 is a flow chart illustrating a processing routine for updating the determination reference.

DETAILED DESCRIPTION OF THE PREFERRED EMBODIMENTS

Figure 1:
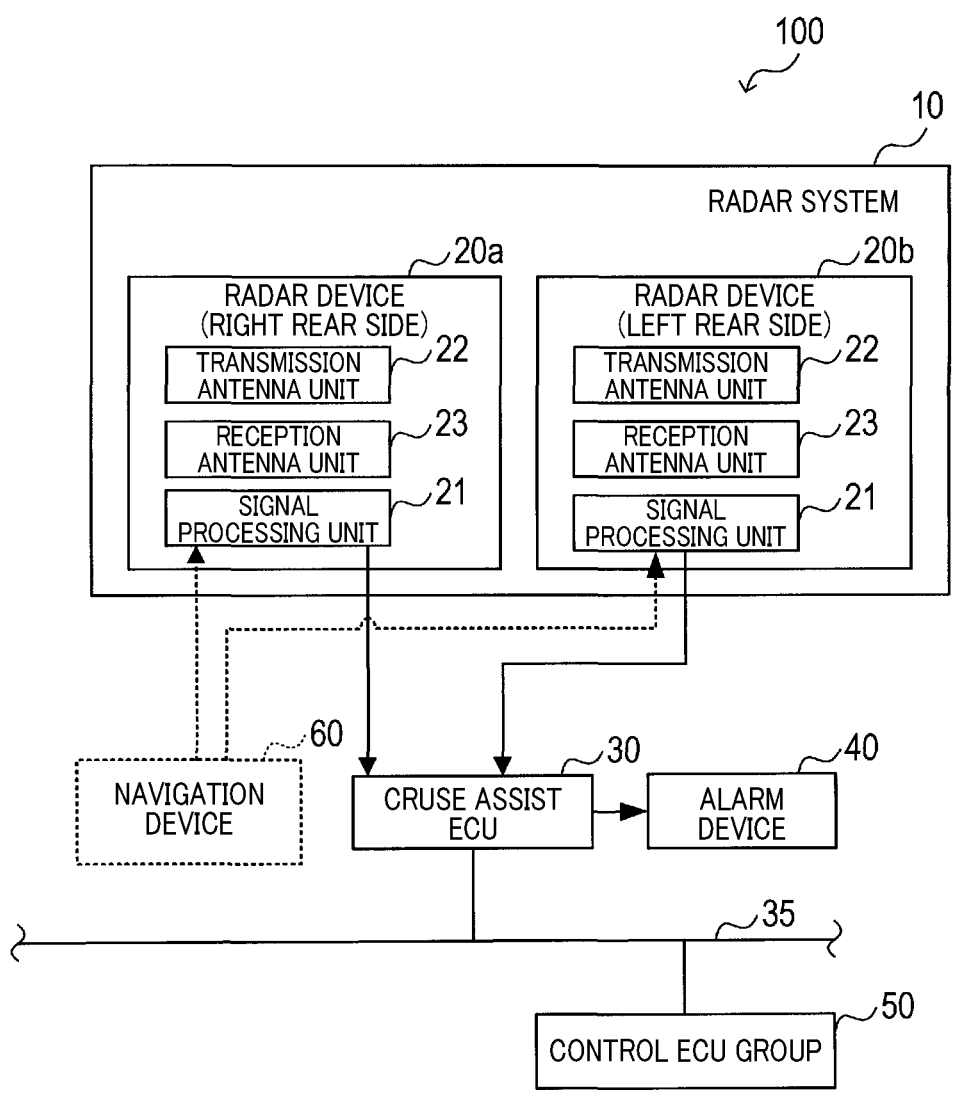
FIG. 1 is a block diagram of a configuration of an on-vehicle system 100 according to the present embodiment.

A radar device mounted on a vehicle that detect a target that is present around the vehicle, such as another vehicle and a stationary object, may cause radio wave interference with a radar device mounted on another vehicle. If these radar devices use a frequency analysis waveform of a beat signal to extract various items of information just as an FMCW radar and a multi-frequency CW radar do, a noise floor of the frequency analysis waveform rises when these radar devices are subject to radio wave interference. This buries in the noise floor the peak of the frequency analysis waveform based on a wave reflected from the target, making it hard to detect the target from the frequency analysis waveform.

These radar devices therefore need to remove the interference when radio wave interference occurs. To perform the process of removing the interference, the radar devices need to accurately detect the occurrence of radio wave interference. Patent Literature 1 below discloses a technique for comparing a noise level with a threshold, which is a fixed value, and detecting occurrence of radio wave interference if the noise level is equal to or greater than the threshold.

[PTL1] JP 2008-232833 A

The noise floor of a frequency spectrum may fluctuate depending on the state and surrounding environment of a radar device. Noise floors are liable to fluctuate as the state and surrounding environment of the radar device change, particularly when the radar device is mounted a vehicle. After detailed examination, the inventor found a problem that the radar device may possibly falsely detect the occurrence of radio wave interference in a situation where a noise floor is relatively high, if the threshold is fixed. Again after detailed examination, the inventor also found a problem that a part of the peak based on a wave reflected from a target is removed from the frequency analysis waveform when the radar device falsely detects the occurrence of radio wave interference and takes a measure against the interference, resulting in deteriorated accuracy in detecting the target.

The present disclosure preferably provides a technique for accurately detecting radio wave interference.

One aspect of the present disclosure is vehicle-onboard surrounding monitoring radar devices (20a, 20b) that repeatedly transmit and receive a radar wave to monitor a target around a vehicle. The surrounding monitoring radar devices (20a, 20b) include a signal generation unit (21), a spectrum generation unit (21), a cycle setting unit (21), a learning unit (21, S30, S40, S90), and an update unit (21, S60). The signal generation unit generates a frequency difference signal indicating a difference in frequency between a transmission signal and a reception signal. The spectrum generation unit carries out a frequency analysis of the frequency difference signal generated by the signal generation unit to accordingly generate a frequency spectrum. The cycle setting unit sets an update cycle for updating of a determination reference, the determination reference being used to determine whether radio wave interference has occurred. The learning unit learns the determination reference to accordingly calculate a learned value of the determination reference during a preset learning period. The learning period is a period until an update timing for the determination reference determined by the update cycle set by the cycle setting unit. At the update timing, the update unit updates a value of the determination reference to the learned value of the determination reference calculated by the learning unit. the learning unit is configured to: set the learning value to an initial value at a start timing of the learning period; compare the learned value with a value of a noise floor of the frequency spectrum generated by spectrum generating unit during the learning period; and update the learned value to the value of the noise floor upon the value of the noise floor being smaller than the learned value.

According to one aspect of the present disclosure, the lowest noise floor value in the learning period is calculated as the learned value of the determination reference until the update timing. The determination reference is then updated to the calculated learned value at the update timing. Even if the noise floor fluctuates, a determination reference can thus be set according to the fluctuation of the noise floor. This in turn makes it possible to accurately detect radio wave interference.

Note that the reference numerals in the parentheses in the claims are intended to indicate how each element referred to by these numerals corresponds to the specific means described in the embodiments described below as a mode, and is not intended to limit the technical scope of the present disclosure.

An illustrative embodiment for carrying out the present disclosure will be described below with reference to the drawings.

[1. Configuration]

An on-vehicle system 100 according to the present embodiment will be first described with reference to FIG. 1. The on-vehicle system 100 includes a radar system 10, a cruise assist ECU 30, an alarm device 40, and another control ECU group 50. The on-vehicle system 100 is assumed to be a system mounted on a vehicle.

The radar system 10 includes radar devices 20*a*, 20*b*. The radar device 20*a* is a right rear radar device installed on the right side of a rear part of the vehicle. The radar device 20*b* is a left rear radar device installed on a left side of the rear part of the vehicle. Basically, the radar devices 20*a* and 20*b* are configured and function identically. In the following description, the radar devices 20*a* and 20*b* are collectively referred to as a radar device 20 or radar devices 20. The radar system 10 may include at least one radar device 20. In other words, the radar system 100 may include a radar device 20 or three or more radar devices 20. In the present embodiment, the radar device 20 corresponds to a surrounding monitoring radar device.

The radar device 20 is a millimeter wave radar that repeatedly transmits and receives a radar wave to monitor the surroundings of a vehicle. The radar device 20 may use any modulation system, such as an FMCW system and a two-frequency CW system. The radar device 20 includes a signal processing unit 21, a transmission antenna unit 22, and a reception antenna unit 23.

The signal processing unit 21 generates a transmission signal, and emits a transmission wave, which is a radar wave, from the transmission antenna unit 22 based on the generated transmission signal. The reception antenna unit 23 receives a transmission wave (i.e., a reflected wave) reflected from a target. The signal processing unit 21 generates a reception signal from the reflected wave received by the reception antenna unit 23 to generate a beat signal. The beat signal is a frequency difference signal whose frequency is a difference in frequency between the transmission signal and the reception signal.

Figure 2:
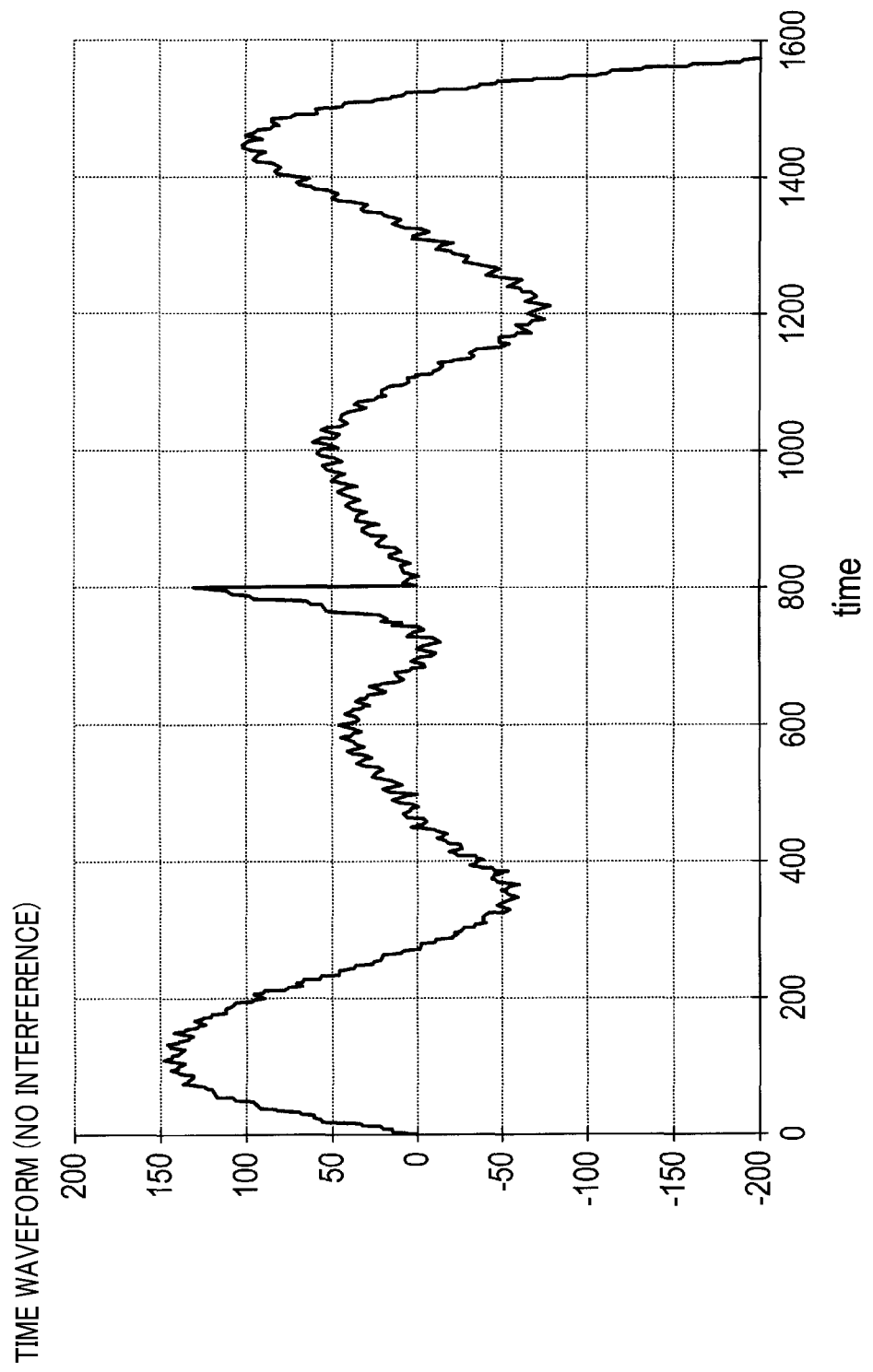
FIG. 2 is a graph showing a time waveform of a beat signal in the absence of radio wave interference.
Figure 3:
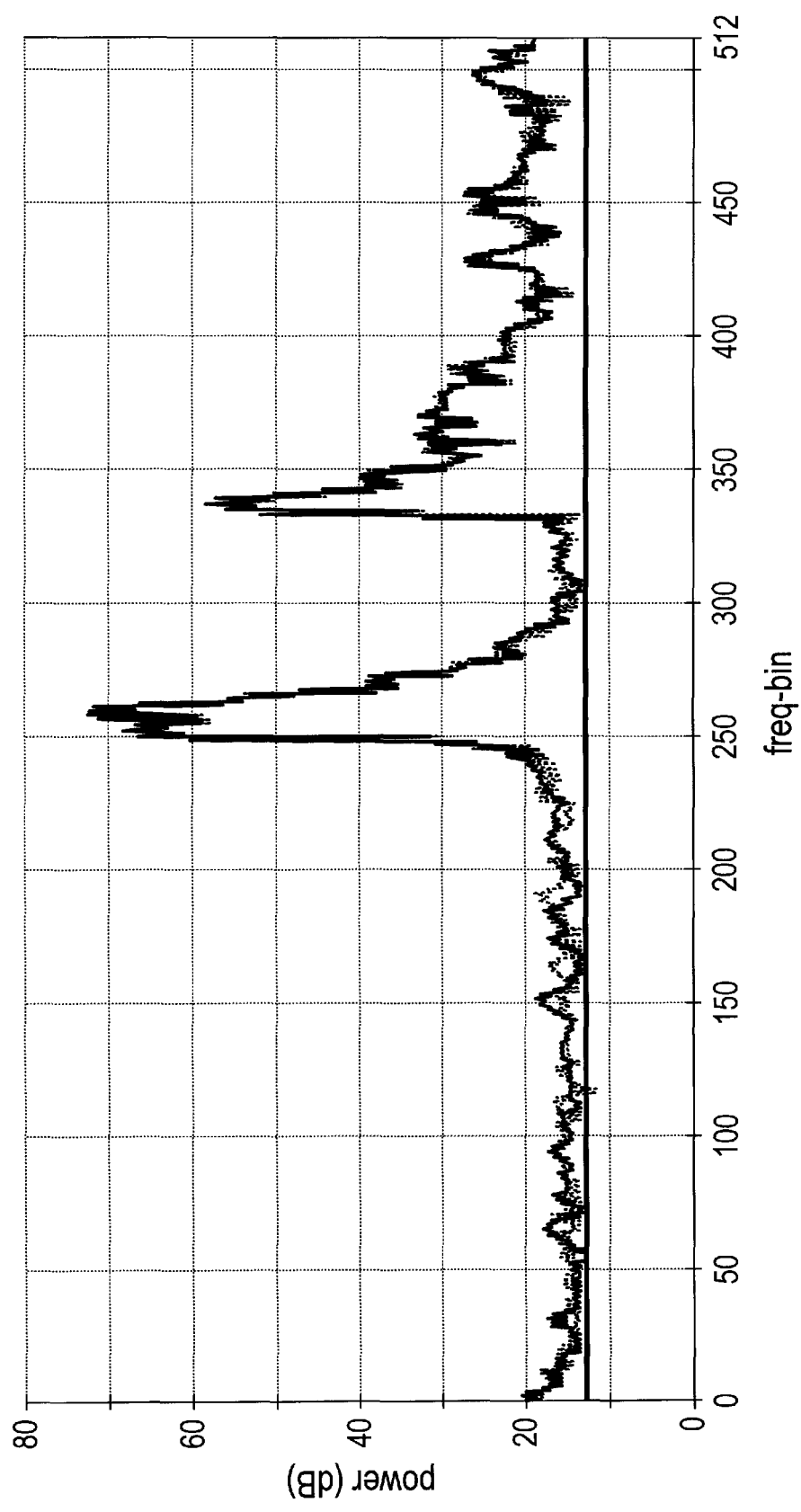
FIG. 3 is a graph showing a spectrum waveform of a beat signal in the absence of radio wave interference.

In addition, the signal processing unit 21 carries out frequency analysis processing such as FFT on the generated beat signal to accordingly generates a frequency spectrum, and extracts one or more peaks as corresponding one or more targets from the generated frequency spectrum. If there is no radio wave interference, only a low level of noise is superimposed on the frequency spectrum waveform of the beat signal, which means that the noise floor level is low in the frequency spectrum waveform of the beat signal, as shown in FIGS. 2 and 3. This enables the signal processing unit 21 to successfully extract the target from the frequency spectrum.

Figure 4:
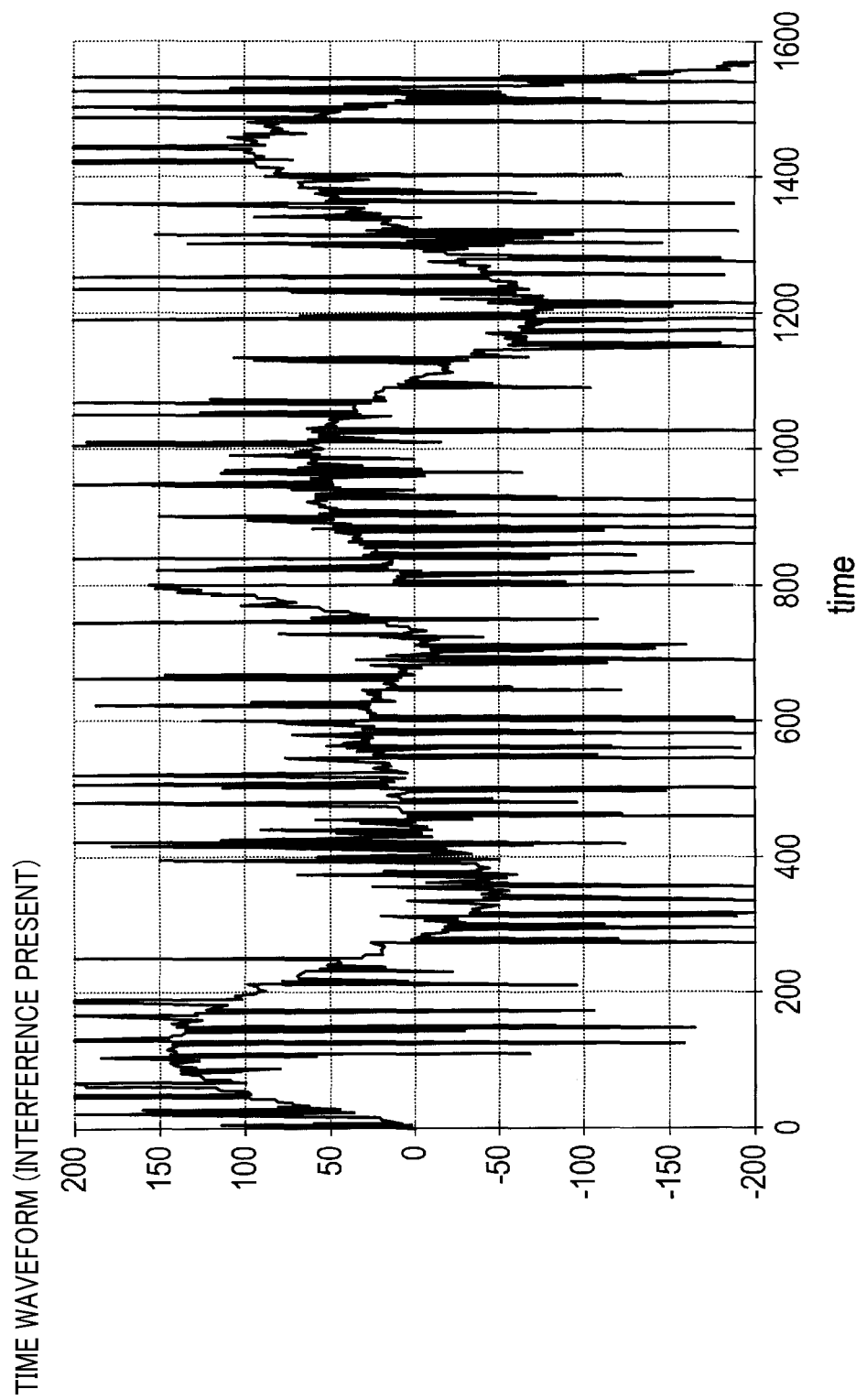
FIG. 4 is a graph showing a time waveform of a beat signal in the presence of radio wave interference.
Figure 5:
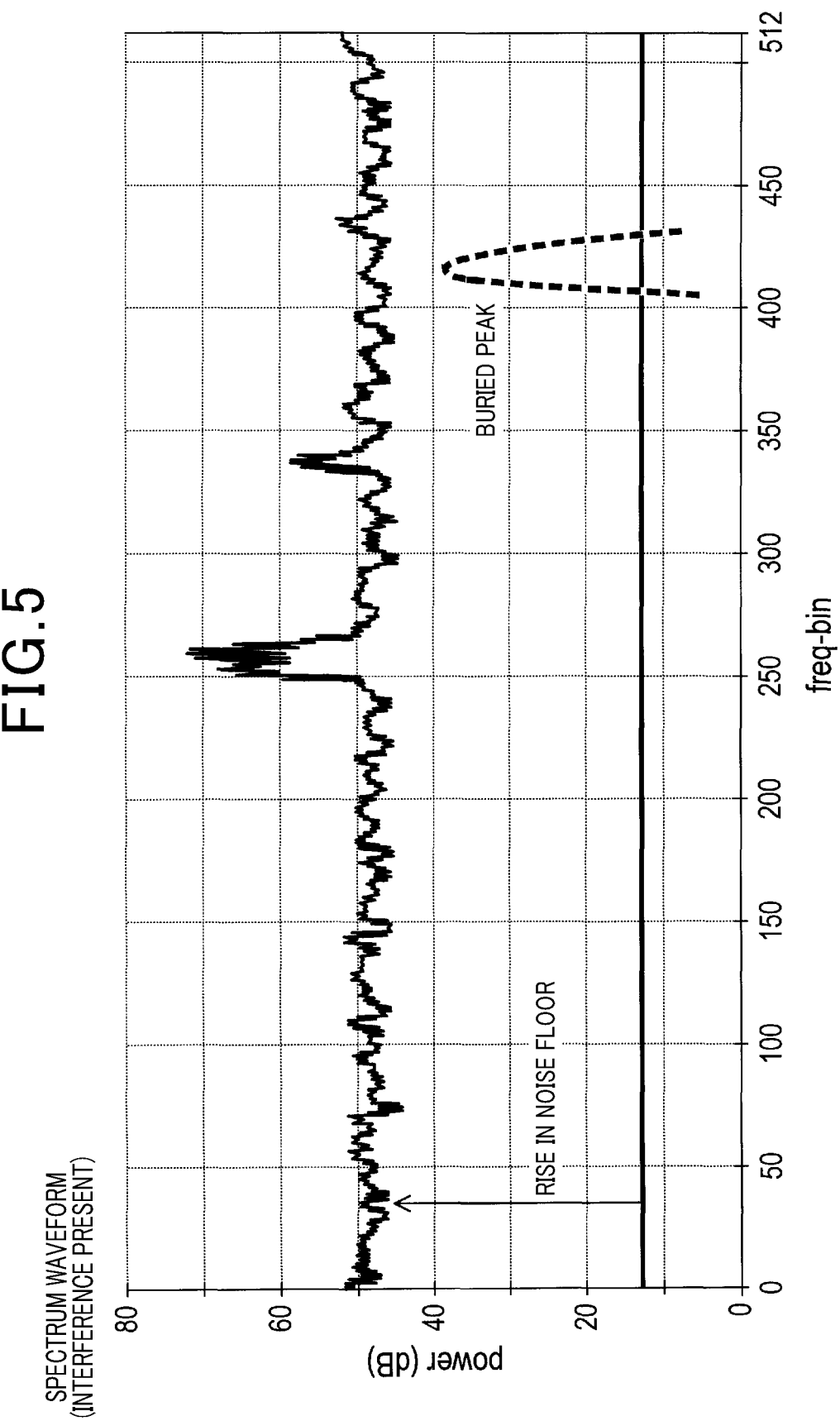
FIG. 5 is a graph showing a spectrum waveform of a beat signal in the presence of radio wave interference.

If radio wave interference has occurred, however, a higher level of noise is superimposed on the time waveform of the beat signal, as shown in FIGS. 4 and 5 than in the case where no radio wave interference occurs, which raises the noise floor level of the frequency spectrum waveform. Therefore, if radio wave interference has occurred, one or more peaks each indicating a target may be buried in the noise floor, which may make it impossible for the signal processing unit 21 to extract one or more targets from the frequency spectrum.

From this viewpoint, the signal processing unit 21 determines whether radio wave interference has occurred. Upon determining that radio wave interference has occurred, the signal processing unit 21 performs a measure against the radio wave interference, and thereafter extracts one or more peaks from the frequency spectrum. Examples of such a measure against radio wave interference include a measure that applies a median filter to the beat signal.

The signal processing unit 21 then generates information about a target based on the frequency spectrum and outputs the generated target information to the cruse assist ECU 30. Examples of the target information include a distance from the vehicle to the target, a relative speed of the target to the vehicle, and an orientation of the target relative to the vehicle. In the present embodiment, the signal processing unit 21 implements the functions of a signal generation unit, a spectrum generation unit, a cycle setting unit, a learning unit, and an update unit.

The cruise assist ECU 30 retrieves target information of a target detected by each radar device 20 from the corresponding radar device 20, and transmits and receives data to and from a control ECU group 50 via a network 35. The cruise assist ECU 30 outputs an alarm output command to an alarm device 40 if there is a target around the vehicle that may possibly collide with the vehicle.

The alarm device 40 includes, for example, an indicator attached to a door mirror or provided inside a vehicle cabin, an in-vehicle speaker, and/or an in-vehicle display. The alarm device 40 outputs a warning sound or an alarm voice or displays a warning in response to the alarm output command issued from the cruise assist ECU 30.

The control ECU group 50 contains a plurality of ECUs mounted on the vehicle other than the cruse assist ECU 30, which are connected to the network 35.

[2. Determination Reference]

Now a description will be given of a determination reference, which is used by the signal processing unit 21 to determine whether radio wave interference has occurred. The signal processing unit 21 compares the noise floor of a frequency spectrum with a determination threshold, and determines that radio wave interference has occurred if the noise floor exceeds the determination threshold. The determination threshold is a value provided by adding a constant offset value to a value of the determination reference calculated based on the noise floor of the frequency spectrum. In the present embodiment, a power minimum value in the frequency spectrum is used as a noise floor.

The noise floor fluctuates depending on the state and/or surrounding environment of the radar device 20. For example, higher temperature of the radar device 20 raises the noise floor. The noise floor also rises as the radar device 20 deteriorates over time. The noise floor declines when the vehicle moves from an urban road to a highway or from an inner city to a desert. This means that the signal processing unit 21 may erroneously detect the occurrence of radio wave interference if the determination reference, or the determination threshold, is fixed.

To avoid such an erroneous detection, the signal processing unit 21 learns a value of the determination reference during a fixed learning period Ts, and updates the determination reference to a learned value for every preset update cycle Tu.

Figure 6:
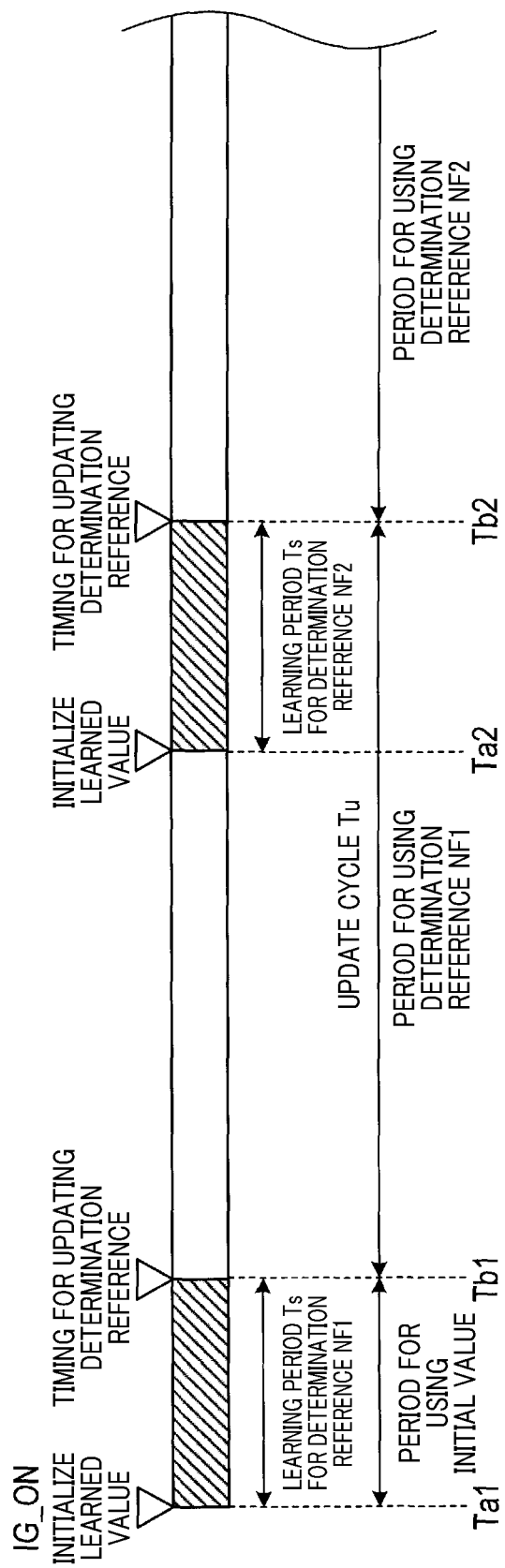
FIG. 6 is a chart showing periods for calculating a value of a determination reference and timings for updating the determination reference.

Specifically, a predetermined initial value is set for the determination reference when the ignition of the vehicle is turned on at a point of time Ta1, as shown in FIG. 6. The signal processing unit 21 then starts to learn the determination reference and continues to learn the determination reference for the learning period Ts. The initial value is used as a value of the determination reference for the initial learning period Ts after the ignition is turned on.

A point of time Tb1, which is a point of time at which the initial learning period Ts ends, serves as a timing for updating the initial value of the determination reference. At the point of time Tb1, the determination reference is updated from the initial value to a learned value NF1 calculated during the learning period Ts. The value NF1 of the determination reference, which is updated at the point of time Tb1, continues to be used until the update cycle Tu elapses from the point of time Tb1.

A point of time Tb2, which is a point of time at which the update cycle Tu has elapsed since the point of time Tb1, serves as a timing for updating the determination reference next. The period from the point of time Ta2, which is earlier than the point of time Tb2, to the point of time Tb2 is a second learning period Ts.

In other words, the update cycle Tu is longer than the learning period Ts, and the learning period Ts is set to a period from the point of time Ta2 to the timing for updating the determination reference.

The signal processing unit 21 sets an initial value for the determination reference again at the point of time Ta2, and starts to learn a value of the determination reference. At the point of time Tb2, the determination reference is updated from the value NF1 to a learned value NF2 calculated during the second learning period Ts.

The value NF2 of the determination reference, which is updated at the point of time Tb2, continues to be used until the update cycle Tu elapses from the point of time Tb2. The signal processing unit 21 repeats the learning and updating of the determination reference similarly thereafter.

As shown in FIG. 7, the initial value of the determination reference should be set to a value that is higher than a standard noise floor generated when there is no radio wave interference and that is lower than a standard noise floor generated when radio wave interference has occurred.

In addition, the signal processing unit 21 may set a value of the update cycle Tu. For example, the signal processing unit 21 may set the update cycle Tu to a certain period. Further, the signal processing unit 21 may also change the update cycle Tu as the state of the radar devices 20 changes. The state of the radar device 20 may include the temperature of the radar device 20 and/or the deterioration state of the radar device 20.

Specifically, the signal processing unit 21 may set the update cycle Tu to (1) A relatively shorter value in response to when the state of the radar device 20 has changed relatively greatly, or (2) A relatively longer value while the state of the radar device 20 is maintained in a stable state This makes it possible to change a value of the determination reference rapidly in response to when the noise floor has dramatically changed.

In addition, the signal processing unit 21 may also change the update cycle Tu as the surrounding environment of the vehicle changes. The surrounding environment of the vehicle includes an attribute of a road on which the vehicle is travelling, such as a general road or a highway, a characteristic of an area on which the vehicle is travelling, such as an urban area or a desert, and a weather characteristic such as temperature, rain, and fine weather.

Specifically, the signal processing unit 21 may set the update cycle Tu to (1) A relatively shorter value in response to when the surrounding environment of the vehicle has changed relatively greatly, or (2) A relatively loner value when the surrounding environment of the vehicle is maintained in a stable state The signal processing unit 21 may obtain information on the surrounding environment of the vehicle from the target information detected by the radar device 20. The signal processing unit 21 may also obtain information on the surrounding environment of the vehicle from a navigation device 60 if the vehicle is provided with the navigation device 60, as shown by a dashed line in FIG. 1. The navigation device 60, which is provided with a storage device storing map data, retrieves the current position of the vehicle and locates the position on the map. Further, the signal processing unit 21 may also change the update cycle Tu as both the state of the radar device 20 and the surrounding environment of the vehicle change.

[3. Processing]

The following describes a processing routine for updating the determination threshold, carried out by the signal processing unit 21, with reference to the flowchart of FIG. 8. The signal processing unit 21 carries out a cycle of the processing routine every time the signal processing unit 21 generates a frequency spectrum of a beat signal. The signal processing unit 21 has preset a value of the update cycle Tu for the determination reference.

First, the signal processing unit 21 determines whether the timing of the current cycle of the processing routine is within the learning period Ts for the determination reference at step S10.

Specifically, the signal processing unit 21 determines whether the timing of the current cycle of the processing routine is within the learning period Ts from a value of a counter described later. The processing routine proceeds to S20 upon determination that the timing of the current cycle of the processing routine is within the learning period Ts. Otherwise, the processing routine proceeds to S50 upon determination that the timing of the current processing cycle is not within the learning period Ts.

Next, the signal processing unit 21 determines whether a measure against radio wave interference has been carried out at step S20. Execution of the measure against the radio wave interference may lower a noise floor depending on the conditions of the radio wave interference, so that calculating a value of the determination reference from the noise floor that is used at execution of the measure against the radio wave interference may provide a value of the determination reference that is smaller than an appropriate value. This may cause a value of the determination threshold to be smaller, resulting in erroneous detection of the radio wave interference.

For this reason, the signal processing unit 21 avoids learning of the determination reference, and the processing routine proceeds to step S80 upon determination that the measure against radio wave interference has been carried out at step S20. At step S80, the signal processing unit 21 increments the value of the counter by 1, and thereafter, terminating the current cycle of the processing routine. On the other hand, the processing routine proceeds to step S30 upon determination that the measure against radio wave interference has not been carried out at step S20.

The signal processing unit 21 determines whether a value of the noise floor in the current cycle of the processing routine is smaller than a learned value of the determination reference at the current point of time at step S30.

If it is determined at step S30 that the value of the noise floor value in the current cycle of the processing routine is equal to or greater than the learned value, then the processing routine proceeds to step S80. At step S80, the signal processing unit 21 increments the value of the counter by 1, and thereafter, terminating the current cycle of the processing routine.

Otherwise, if it is determined at step S30 that the value of the noise floor in the current cycle of the processing routine is smaller than the learned value, then the processing routine proceeds to step S40.

At step S40, the signal processing unit 21 updates the learned value to the value of the noise floor in the current cycle of the processing routine, and thereafter, the processing routine proceeds to step S80. At step S80, the signal processing unit 21 increments the value of the counter by 1, and thereafter, terminating the current cycle of the processing routine.

This causes the learned value to be set to the lowest value of the noise floor in the learning period Ts. As shown in FIG. 7, the learned value is not updated during the current learning period Ts if the lowest value of the noise floor in the previous processing cycles is smaller than the value of the noise floor of the current cycle of the processing routine.

On the other hand, at step S50, the signal processing unit 21 determines, based on the value of the counter, whether the timing of the current cycle of the processing routine after the end of the learning period Ts is a timing for updating the determination reference. If it is determined at step S50 that the timing of the current cycle of the processing routine is not a timing for updating the determination reference, then the processing routine proceeds to step S70. Otherwise, if it is determined at step S50 that the timing of the current cycle of the processing routine is a timing for updating the determination reference, then the processing routine proceeds to step S60.

At step S60, the signal processing unit 21 updates the value of the determination reference to the learned value at the present point of time. Thereafter, the signal processing unit 21 increments the value of the counter by 1, and thereafter, terminating the current cycle of the processing routine.

After termination of the updating of the determination reference, the signal processing unit 21 determines, based on the value of the counter, whether the timing of the current cycle of the processing routine is within a usage period of the value of the determination reference at step S70.

If it is determined at step S70 that the timing of the current cycle of the processing routine is within the usage period of the value of the determination reference, then the processing routine proceeds to step S80. At step S80, the signal processing unit 21 increments the value of the counter by 1, and thereafter, terminating the current cycle of the processing routine.

Otherwise, if it is determined at step S70 that the timing of the current cycle of the processing routine is located outside the usage period of the determination reference, then the processing routine proceeds to step S90. In other words, the processing routine proceeds to step S90 upon determination at step S70 that the timing of the current cycle of the processing routine is a starting timing immediately before start of a corresponding learning period Ts because the timing of the current cycle of the processing routine does not match 1. The learning period Ts
2. The timing for updating the determination reference
3. The usage period of the determination reference At step S90, the signal processing unit 21 sets the value of the counter to 0 to thereby initialize the counter, and sets the learned value to an initial value for the determination reference to thereby initialize the learned value before terminating the current cycle of the processing routine.

[4. Effects]

The present embodiment described above provides the following effects (1) to (5):

The effect (1) is that the lowest value of the noise floor in the learning period Ts is calculated as a learned value of the determination reference, and the determination reference is updated to the learned value at a timing for updating the determination reference. Even if the noise floor fluctuates, it is possible to set a value of the determination reference according to fluctuations of the noise floor. This makes it possible to accurately detect radio wave interference.

The effect (2) is that changing the update cycle Tu in accordance with a change in the state of the radar device 20 enables a value of the determination reference to be changed rapidly even if the noise floor fluctuates due to changes of the state of the radar device 20.

The effect (3) is that changing the update cycle Tu in accordance with a change in the surrounding environment of the vehicle enables a value of the determination reference to be changed rapidly even if the noise floor fluctuates due to changes of the surrounding environment of the vehicle.

The effect (4) is that keeping the update cycle Tu constant enables the computational load of the signal processing unit 21 to be reduced.

The effect (5) is that ceasing update of a learned value of the determination reference during measuring of radio wave interference makes it possible to suppress the determination reference from becoming too small. This prevents erroneous detection of radio wave interference.

Other Embodiments

Although the embodiment to implement the present disclosure has been described so far, the disclosure is not limited to the embodiment described above but may be implemented in various ways.

(a) The noise floor assumes the lowest power value in a frequency spectrum in the embodiment described above, but the present disclosure is not limited thereto. For example, a histogram of how frequently each power value appears may be created based on a power value calculated for each frequency bin, and the most frequent power value can be used as a value of noise floor. An average of the power values in the region excluding a region around the peak from a frequency spectrum waveform may also be used as a noise floor.

(b) A plurality of functions possessed by a single component in the embodiment described above may be implemented by a plurality of components, or a single function possessed by a single component may be implemented by a plurality of components. In addition, a plurality of components possessed by a plurality of components may be implemented by a single component, or a single function implemented by a plurality of components may be implemented by a single component. Further, the configuration of the embodiment described above may be partially omitted. Still further, at least part of the configuration of the embodiment described above may be added to or replaced with the configuration of the other embodiment described above. Note that all the modes included in the technical ideas identified by only the words described in the claims are embodiments of the present disclosure.

(c) The present disclosure can be implemented in various forms, such as a system consisting of the surrounding monitoring radar device, a determination reference learning device, a program for functioning a processing device as a determination reference learning device, a non-transitory tangible recording medium such as a semiconductor memory having the program recorded thereon, a method of learning a determination reference, as well as the surrounding monitoring radar device described above.

What is claimed is:

1. A surrounding monitoring radar device that is mounted on a vehicle and repeatedly transmit and receive radar waves to monitor a target surrounding the vehicle, the device comprising:
 a signal generation unit configured to generate a frequency difference signal indicating a difference in frequency between a transmission signal and a reception signal;
 a spectrum generation unit configured to carry out a frequency analysis of the frequency difference signal generated by the signal generation unit to accordingly generate a frequency spectrum;
 a cycle setting unit configured to set an update cycle for updating of a determination reference, the determination reference being used to determine whether radio wave interference has occurred;
 a learning unit configured to learn the determination reference to accordingly calculate a learned value of the determination reference during a preset learning period, the learning period being a period until an update timing for the determination reference determined by the update cycle set by the cycle setting unit; and
 an update unit configured to update a value of the determination reference to the learned value of the determination reference calculated by the learning unit at the update timing, wherein:
 the learning unit is configured to:
  set the learning value to an initial value at a start timing of the learning period;
  compare the learned value with a value of a noise floor of the frequency spectrum generated by spectrum generating unit during the learning period; and
  update the learned value to the value of the noise floor upon the value of the noise floor being smaller than the learned value.

2. The surrounding monitoring radar device according to claim 1, wherein the cycle setting unit is configured to change the update cycle according to change in a state of the surrounding monitoring radar device.

3. The surrounding monitoring radar device according to claim 1, wherein the cycle setting unit is configured to change the update cycle according to change in a surrounding environment of the vehicle.

4. The surrounding monitoring radar device according to claim 1, wherein the cycle setting unit is configured to set the update cycle to a certain period.

5. The surrounding monitoring radar device according to claim 1, wherein the learning unit is configured to cease update of the learned value upon determination that a measure against radio wave interference has been carried out.

* * * * *